Nov. 23, 1926.
C. NIELSEN
INFANT'S FOOD
Filed March 24, 1922
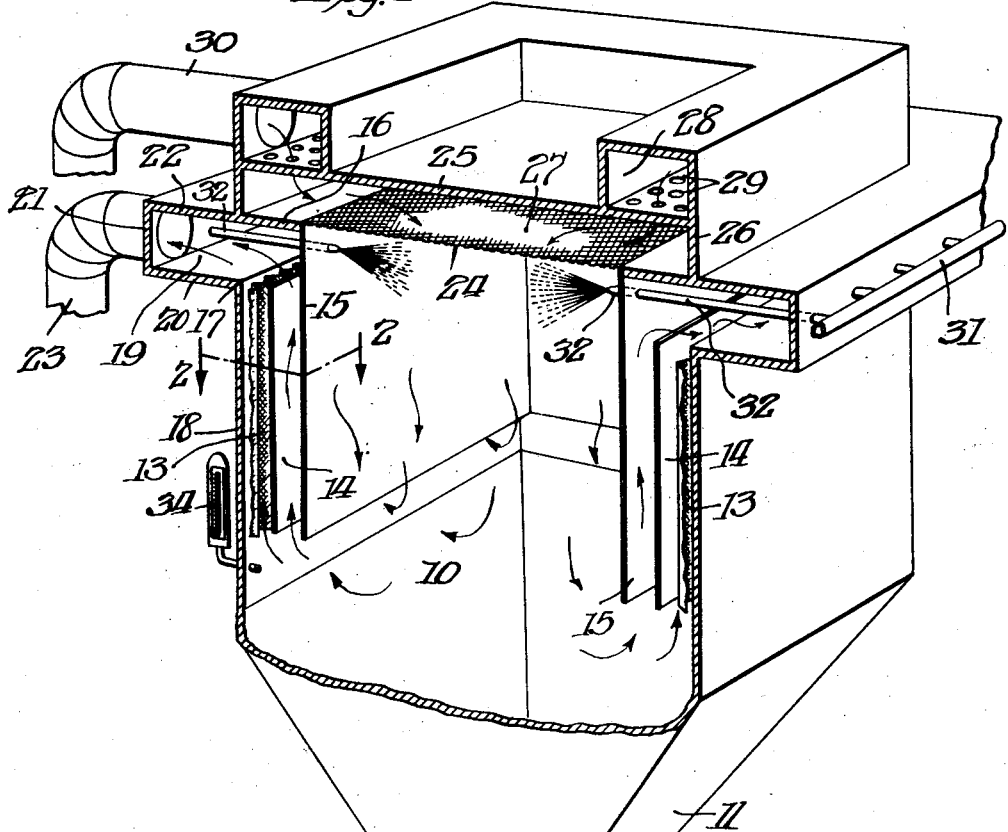
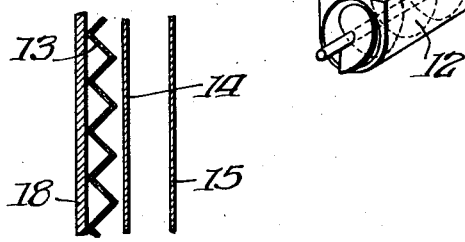
Inventor:
Carl Nielsen,
By Fisher Towle Clapp & Soans
Attys.

Patented Nov. 23, 1926.

1,607,844

UNITED STATES PATENT OFFICE.

CARL NIELSEN, OF CHICAGO, ILLINOIS, ASSIGNOR TO ABBOTT LABORATORIES, OF CHICAGO, ILLINOIS, A CORPORATION OF ILLINOIS.

INFANT'S FOOD.

Application filed March 24, 1922. Serial No. 546,271.

My invention relates to the production of a food for infants, children and invalids, and its principal object is to produce a food which shall have a nutritive value substantially equal to that of normal human milk.

In the drawings accompanying this application I have illustrated one form of apparatus for carrying out the desiccation step of my invention. In said drawings:

Fig. 1 is a perspective view of the evaporating chamber, certain parts being broken away to better illustrate the construction; and Fig. 2 is a section taken on the line 2—2 of Fig. 1.

The science of dietetics during the past generation has made rapid strides. It is now generally recognized by the medical profession and also to a large extent by the laity that the nutritive value of a food depends on its calorific content and also upon the relative percentages of its various principal nutritive constituents such as fat, carbo-hydrates, proteins and mineral salts. But a system of diet which provides the number of calories required for the sustenance of the particular individual and which furnishes the above ingredients or constituents in the desired proportions is by no means complete unless it also contain the necessary amount of what are termed "vitamines."

In this specification it will not be necessary for me to enter into an elaborate discussion of vitamines, or of the importance of same in a correct system of diet. It is sufficient to state that vitamines have been divided into three classes, namely: Vitamine "A" fat soluble element, vitamine "B" water soluble element, vitamine "C" antiscorbutic element. Each class of vitamines is an important and necessary element of diet, and exclusion of any one of them over an extended period will result in a very detrimental effect upon the health of the individual.

Where the individual is an infant, child or invalid, and in addition to normal nutritive requirements, requires a further amount of nutrition to insure proper growth, or to repair the ravages of disease, these considerations become increasingly important.

Physicians and dietitians have agreed that with rare exceptions, the proper diet for an infant, during the first nine months of its life at least, is that provided by nature, namely, human milk, as it should contain all of the ingredients in the necessary proportions to provide proper nutrition. Human milk varies considerably in its composition, according to the particular period. There are three periods, the colostrum period, which usually lasts from one to twelve days after birth; the transition period which follows the colostrum period, and usually lasts until the thirtieth day after birth; and what is termed the mature period, which usually extends from one month after birth to nine months after birth, and during which mature period the milk should maintain substantially the same average composition and nutritive effect. Milk of the mature period I call "normal human milk." Such milk has the following average composition:

|  | Per cent. |
|---|---|
| Fat | 3.0 |
| Carbo-hydrates | 7.5 |
| Proteins (including casein 0.4% and lactalbumen 0.8%) | 1.2 |
| Ash (mineral salts) | .25 |

Ordinary cow's milk, on the other hand, contains 4% fat, only 4% of carbo-hydrates and an enormous excess of protein, viz, 4.3% and ash .65%. Furthermore, the proteins in cow's milk comprise 4% of casein and 0.3% of lactalbumen; that is to say, cow's milk contains one-third more fat, only about half the carbo-hydrates, ten times as much casein and less than half as much lactalbumen as "normal mother's milk."

Attempts have been made to modify cow's milk by adding carbo-hydrates, usually in the form of milk sugar, and by the addition of prepared pre-cooked foods, which foods, however, in general are prepared from cow's milk as a base and have no beneficial effect in lowering the percentage of protein, except by dilution, or in changing the relative proportions of casein and lactalbumen.

After a long series of experiments and tests, I have found that it is possible to produce, from available materials, milk, the ingredients of which have the same relative proportions and are substantially similar, chemically and nutritively, to the constituents of normal human milk. For convenience, my improved milk is prepared as a powder having the following average composition:

| | Per cent. |
|---|---|
| Butter fat | 24.0 |
| Carbo-hydrates (milk sugar 15%, maltose and dextrines 44%) total | 59.0 |
| Proteins, of which casein represents 3.2% and lactalbumen 6.4% total | 9.6 |
| Mineral salts, of which $K_2O$ and $CaO$ together represent more than half. Orange juice (solid equivalent) | 5.45 |
| Moisture | 1.95 |
| Vitamines "A", "B" and "C" not isolated. | |
| Total | 100.00 |

*Process.*

The cream is skimmed or separated from fresh milk, Pasteurized or not Pasteurized, containing 3½% to 4% of butter fat. Said cream will ordinarily contain 18% of butter fat, and is homogenized by any suitable process.

In the homogenized cream, I dissolve the maltose and dextrines formed by treating cereals in the usual way with barley malt. Said maltose-dextrines mixture ordinarily contains about 50% maltose and 50% dextrines, and sufficient of same is dissolved in the cream so that, according to past experience in practicing the process, the ultimate product will contain 59% total carbohydrates.

To the liquid there is then added a quantity of soluble lactalbumen. The amount added with that already present in the fresh cream, makes up the required 6.4% lactalbumen present in the ultimate product. Said soluble lactalbumen may be prepared or isolated from sweet whey by the process invention by Prof. Weimer of the U. S. Agricultural Bureau and set forth in U. S. Patent No. 1,381,605, issued June 14, 1921. Sufficient fresh orange juice is then added to the mixture to represent with the mineral salts, 5.45% (solid equivalent) of the final product.

The liquid mixture then contains about 60% of solids, and is dried by the process and by the apparatus by way of illustration now to be described. If other drying apparatus or systems are employed, care should be taken that the material is not subjected to high temperatures for extended periods or to highly oxidizing agencies, otherwise the vitamine content may be impaired.

Referring to the drawings, 10 represents a large evaporating chamber, for instance, 15 feet square and in the neighborhood of 18 feet in height, the lower ends of the walls of the chamber being made in the shape of a cone or funnel, as at 11, in order to conduct the material to a central discharging device 12. Said discharging device may be a worm propeller with a continuous movement as shown, or if desired, a simple, manually controlled gate or valve may be employed. However, I prefer to use a continuous discharge for the reason that it is advantageous to move the dried material from the evaporating chamber as rapidly as possible so that it may be cooled quickly, thereby preventing injury to the vitamines or other important nutritive constituents.

There is hung from the upper edges of the walls of the chamber and covering the inner surface of said walls for a distance of approximately two-thirds of the height of the chamber, a muslin curtain 13, said curtain being arranged in corrugated or zig-zag fashion in vertical plan (see Fig. 2). Within the muslin curtain 13 and covering the same, slightly spaced therefrom and supported by any suitable means, there is a sheet or diaphragm 14, and within the diaphragm 14 and also spaced therefrom I secure an inner diaphragm or false wall 15.

The diaphragm or inner wall 15 extends all the way to the top of the chamber, while the muslin curtain 13 and the intermediate wall 14 terminate at a short distance below the top wall 16 of the chamber. The space between the upper wall 16 and the upper edge 17 of the outer wall 18 of the chamber constitutes an evacuation or discharge conduit 19 extending all around the chamber and enclosed by lower wall 20, side wall 21, and extension 22 of wall 16 previously referred to. Pipes as at 23, communicating with said conduit 19, serve to draw out gases or vapor entering discharge conduit 19 from the chamber.

Within the area defined by the upper edges of the inner wall 15 of the evaporating chamber, the upper wall of the evaporating chamber takes the form of a reticulated screen 24 through which the vaporizing medium is admitted to the chamber. Said screen 24 may be of any convenient material, for instance, 40 mesh wire cloth may be used with good effect. A ceiling 25 and side walls as at 26, form or constitute an enclosure 27 extending over the screen area and above the said enclosure 27 and around the margin thereof extends an inlet conduit 28, which inlet conduit is connected with the enclosure 27 by a series of apertures 29 perforated in that portion of the ceiling 25 which constitutes the partition of the enclosure 27 and conduit 28.

A heated medium such as ordinary air at a temperature of 300° to 400° Fahrenheit, is admitted or forced into the inlet conduit through pipes as at 30. Proper circulation of the gaseous evaporating medium through the chamber may be effected by a blower in connection with an inlet pipe 30 or by means of a suction fan connected by pipes 23, or by both blower and fan.

The liquid mixture prepared, as previously described, is forced under high pressure, for instance, 100 pounds per square inch, into an inlet conduit 31, said conduit 31 communicating with a plurality of inwardly extending spray pipes 32 terminating in nozzles, as at 33, extending just into the the inner compartment of the evaporating chamber through the inner partition wall 14 and adjacent the screen 24. Nozzles 33 are so constructed that the liquid will be atomized very completely, being converted into a species of fog which will descend slowly to the bottom of the chamber.

By reason of the screen 24 the heated gaseous evaporating medium will be distributed over the entire area of the inner compartment of the evaporating chamber, in its descent through the chamber will blanket, and will come in intimate contact with, the fog or mist of the sprayed liquid. The effect will be that the particles will be almost instantaneously evaporated, and in so evaporating, the liquid particles of the gaseous medium will give up a large portion of its heat units in the formation of vapor, on account of the latent heat of the steam thus produced. By the time that the mixture of fog particles and heated air reaches the lower end of the inner compartment formed by partition wall 15, the particles of spray will have been converted completely into solid form, and the temperature of the evaporating medium will have been reduced to approximately 140° Fahrenheit, or in some cases rather higher.

A thermometer 34 located slightly below the bottom of the wall 15 may be employed for the purpose of enabling the temperature condition to be noted. If the temperature is found to be too high, more liquid is admitted, i. e., more pressure is applied, or the flow or temperature of the incoming evaporated medium may be somewhat reduced.

The cooled gaseous evaporating medium which also includes water vapor formed by the evaporation of the spray, passes under the lower edge of the partition 15 and up through the spaces between partition walls 14 and 15 and between the muslin curtain 13 and partition wall 14. The solid particles in the form of dust fall into the cone or funnel 11 and are discharged through the device 12. As quickly as possible after the powder has been drawn from the evaporating chamber, it is cooled to room temperature, or desirably somewhat lower, and is then packaged in cans or other receptacles, preferably by a forced filling process in order to make the powder as small in bulk as possible, and thereby to reduce the quantity of air present in the completed package.

My improved food will keep and is stable for years at ordinary temperature and will withstand even tropical temperatures for extended periods. Its keeping qualities are partly due to the fact that the fat globules of the original fresh cream have been materially decreased in size by the homogenizing process and not only have not been ruptured by the desiccating process, but in addition have been enveloped by the lactalbumen and sugars added to the fresh cream. Thus the globules of fat being protected from the action of the atmosphere by their insulating coating of these materials do not become rancid.

My improved food is usually used in a one-eighth strength, i. e., one ounce by weight of the dried powder is mixed or dissolved to form an emulsion or solution in seven parts by weight of water. It is very palatable, in fact very much more so than the ordinary artifically-prepared baby food. Its physiological effect in passing through the digestive tract is practically identical with that of human milk, and nutritively it is also equal to human milk, for the reason that its principal nutritive ingredients are in the same relative proportions and are chemically and nutritively equivalent to such constituents present in human milk.

The growth of the bony and other tissues of the infant is very well taken care of for the reason that not only does the food contain the same minerals as normal human milk, but essential minerals are present in even greater proportions than in the human article.

A very important feature in connection with this improved product is the maintenance of the vitamines present in human milk, namely, vitamines "A", "B" and "C", which also occur in necessary proportions in my improved food. Furthermore, owing to the fact that the food itself contains a considerable percentage of orange juice, it is not necessary to feed the baby with additional orange juice as is very often the practice after the infant reaches the age of a few months. It will be understood that orange juice is of particular value in furnishing the antiscorbutic vitamine element C. Owing to the brief heating, practically instantaneous vaporization and the subsequent rapid cooling of the solid product, the vitamine content is substantially unaffected by the drying process.

I have stated that ordinary cow's milk contains about ten times as much casein, and about half as much lactalbumen as is present in normal human milk, the large excess of casein present resulting in a large excess in protein content as compared with normal human milk. It will be understood that I have described a method of preparing a powdered product which I consider ideal from the standpoint of duplicating the proportions of the various ingredients present in normal human milk. Owing to the wide differences in the ability with which children are able to assimilate various foods or types of foods, and the difficulties attending the determination of the precise amounts of the various percentages of the ingredients necessary for sustenance or which may be assimilated by various subjects, it is obviously impossible for me to state how closely the ideal percentages which I have set forth must be approximated in all cases. I may state it as a general rule however, that in a milk designed to replace normal human milk, lactalbumen ought to be about double that present in ordinary cow's milk, while the casein content should be reduced sufficiently to bring the total protein content to an amount not materially in excess of that present in normal human milk. Precisely how much casein may be assimilated is manifestly impossible to state for all cases. These facts have been recognized by physicians for many years, but as far as I am aware, before my invention, no one has been able to produce a milk which in percentages of the specified ingredients even approximates those in ordinary human milk.

The described details of composition, process and apparatus employed being merely illustrative of a single phase of my invention, the scope of same should be determined by the appended claims, said claims being construed as broadly as possible consistent with the state of the art.

I claim:

1. An article of diet, containing casein and lactalbumen of non-human origin in substantially the same relative proportions as in normal human milk.

2. An article of diet, containing fat, carbohydrates, casein and lactalbumen of non-human origin in the same relative proportions as such ingredients are present in normal human milk.

3. As a new article of manufacture, a powder consisting substantially of fat, carbo-hydrates, casein and latcalbumen of non-human origin having the same relative ratios by weight as in normal human milk.

4. The improvement in the art of producing an article of diet, suitable for infant's food, which consists in mixing together in the presence of water, to form a liquid, butter fat, carbo-hydrates, casein and lactalbumen in substantially the same proportions by weight as in normal human milk, and subsequently removing the moisture to form a solid product.

5. The improvement in the art of producing an article of diet, suitable for infants' food, which consists in mixing together in the presence of water, to form a liquid, butter fat, carbo-hydrates, casein and lactalbumen in substantially the same proportions by weight as in normal human milk, and spraying said liquid into a gaseous heated medium, and thereby removing its water content and forming a solid powder.

6. As a new article of manufacture, powdered milk containing materially more lactalbumen and much less casein than is present in ordinary dried cow's milk, so that the total protein content is proportionately not greatly in excess of that present in normal human milk.

7. As a new article of manufacture, powdered milk containing substantially twice as much lactalbumen as is present in ordinary dried cow's milk, while the casein content is low enough so that the total proteins present are proportionately not materially in excess of those present in normal human milk.

8. The improvement in the art of producing a reconstructed powdered milk, which consists in mixing in the presence of water to form a liquid, butter fat and carbohydrates together with casein and lactalbumen, the lactalbumen content being materially greater than that of ordinary cow's milk, while the casein content is much less, so that the total proteins present are not materially more than those present in normal human milk, and then removing the surplus moisture.

9. The improvement in the art of producing a reconstructed powdered milk which consists in mixing with a bovine lacteal fluid having a greater percentage of butter fat than is present in ordinary milk, a sufficient quantity of carbohydrates and lactalbumen to bring the proportions of said three last named ingredients to a value not materially different from those in normal human milk, and then removing the surplus moisture to form a solid compound.

10. The improvement in the art of producing an article of diet suitable for infant's food, which consists in mixing together ordinary bovine cream, carbohydrates and lactalbumen, the last two ingredients being present in substantially the same proportions by weight, as in normal human milk, and subsequently removing the moisture to form a solid product.

CARL NIELSEN.